No. 680,159. Patented Aug. 6, 1901.
E. MAGALDI.
BELT CHAIN.
(Application filed May 14, 1901.)
(No Model.) 2 Sheets—Sheet 2.
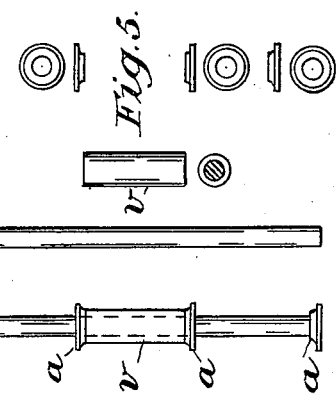
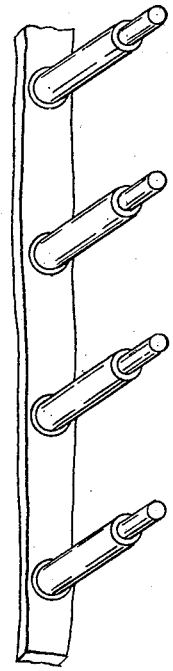
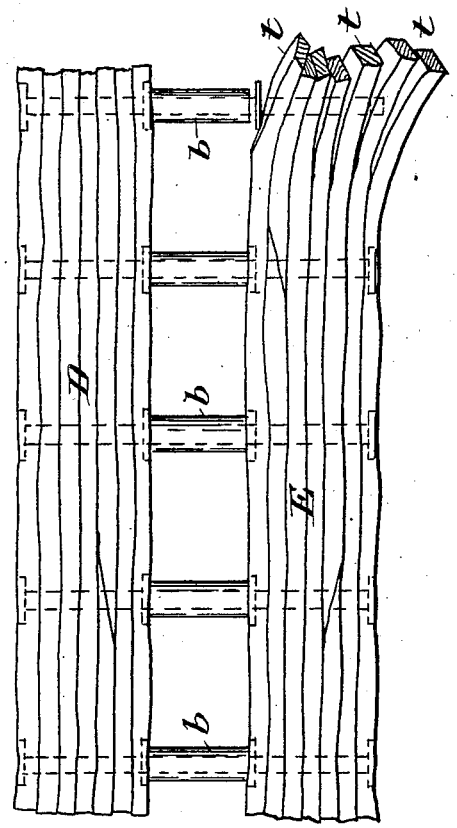
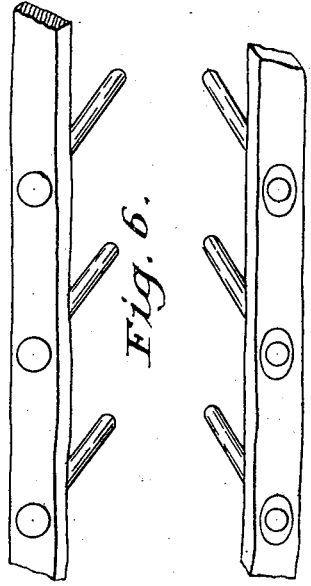
Witnesses:
E. B. Bolton
Inventor:
Emilio Magaldi
By Richards & Co.
his Attorneys.

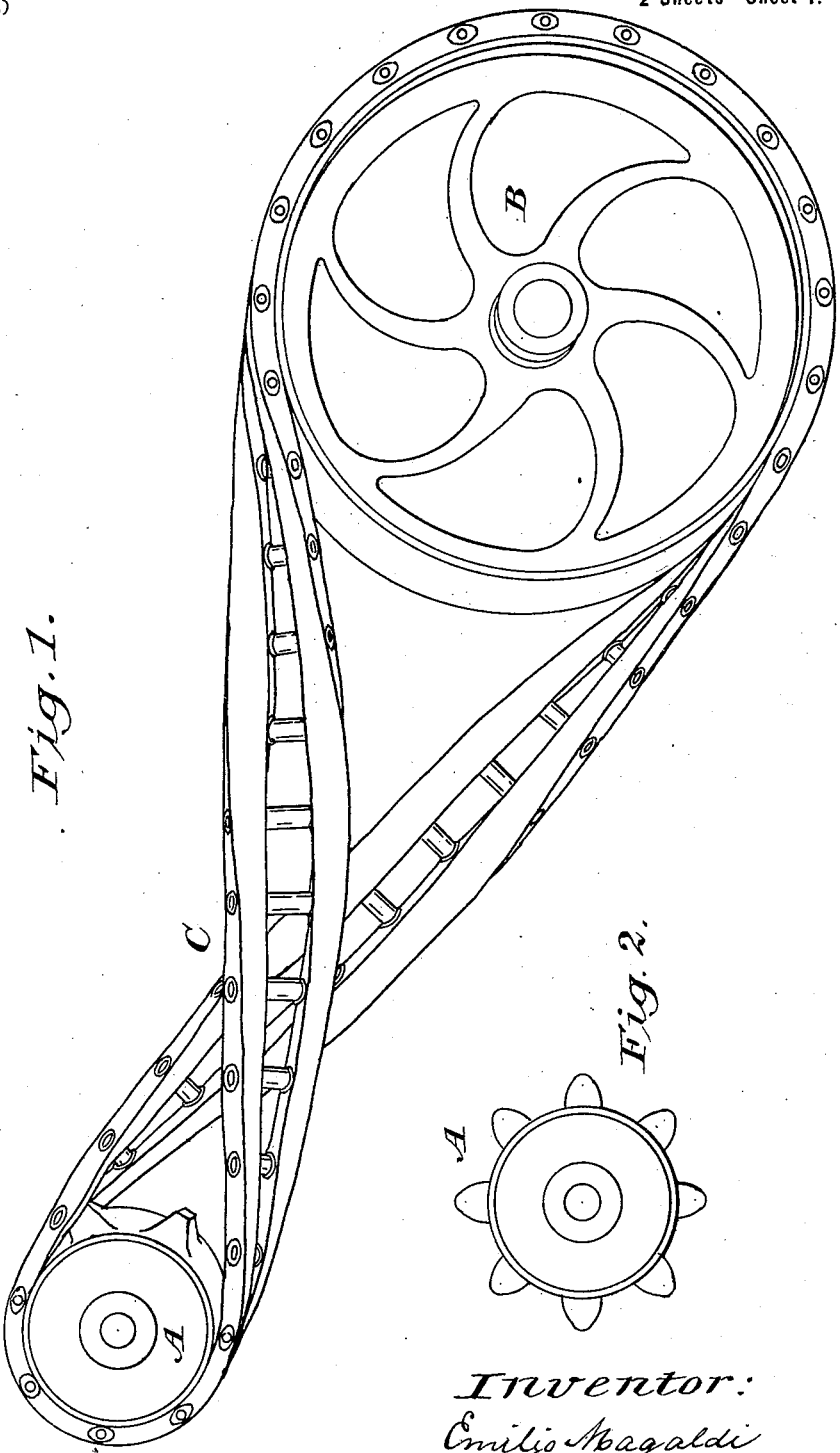

UNITED STATES PATENT OFFICE.

EMILIO MAGALDI, OF BUENOS AYRES, ARGENTINA.

BELT-CHAIN.

SPECIFICATION forming part of Letters Patent No. 680,159, dated August 6, 1901.

Application filed May 14, 1901. Serial No. 60,135. (No model.)

*To all whom it may concern:*

Be it known that I, EMILIO MAGALDI, a subject of the King of Italy, residing at No. 785 Calle Rivadavia, in the city of Buenos Ayres, Argentina, have invented certain new and useful Improvements in Belt-Chains; and I do hereby declare the following to be a full, clear, and exact description of the invention, such as will enable others skilled in the art to which it appertains to make and use the same.

I call my invention a "belt-chain" because it forms a transmission which can operate as a belt, as a chain, or as both at the same time.

The belt-chain of my invention may be constructed of any width and may be used in several independent sections running over the same pulleys or toothed wheels, grooved wheels, or the like, by means of which advantage it is possible to transmit great units of energy. The disposition which I give to the leather permits me to dispense with the compression of the connective texture, and therefore it presents a rough surface which is preserved for a long period for the perfect adhesion of the belt to the pulleys and a maximum resistance in tension. Owing to this disposition I am able to employ leathers tanned or preserved by any system, even those tanned by mineral substances, without the necessity of the addition of oily substances.

In the accompanying drawings, which for the better explanation of my invention represent a belt constructed according to my invention, Figure 1 is a view in perspective of my belt-chain applied to the transmission of force from a pulley B to a toothed wheel A. This figure demonstrates also at C the possibility of crossing this belt. Fig. 2 shows the profiles of the teeth of the toothed wheel A. Fig. 3 is a front view of the belt-chain with the two undulated groups or sets D and E, composed of series of leather strips fastened together. These two sets D and E are compressed by means of the bolts or pins $b$, which form the openings in the middle part of the belt. The lower group or set E shows the strips separated, as they are before being untied. Figs. 4 and 5 represent one of the bolts or pins $b$ before being used and the same with the ferrules and retaining-washers $d$. Figs. 6, 7, and 8 are views in perspective showing the disposition of the bolts and ferrules on the strips of leather.

As may be readily seen by a glance at the drawings, which give an idea of the construction of my belt-chain, on uniting the leather strips $t$ by means of the bolts $b$ the compression is such as to reduce the width of the belt, producing a constant undulation between one bolt and another. On subjecting the belt-chain to a high tension the undulated parts have a tendency to straighten, producing, then, as many sections of elasticity as there are bolts independently of the natural elasticity of the leather.

Having thus described the nature of my invention and the manner in which the same is to be performed, that which I claim as new, and desire to secure by Letters Patent, is—

1. A power-transmitting device comprising strips of leather, bolts extending transversely between and secured to the strips and ferrules on the bolts between the strips, substantially as described.

2. A power-transmitting device comprising strips of leather and bolts extending between them, said strips being held separated to leave the bolts exposed for engagement with sprocket or chain wheels, substantially as described.

3. In combination, the strips of leather set with their edges upward and cross connections, said cross connections being exposed for engagement of chain-wheel teeth, substantially as described.

4. In combination, a chain composed of strips of leather and cross-bolts and a chain-wheel to engage said bolts, substantially as described.

In witness whereof I have hereunto affixed my signature in presence of two witnesses.

EMILIO MAGALDI.

Witnesses:
PEDRO A. BREUER,
FR. COS. TORT.